United States Patent [19]

Funk et al.

[11] 4,386,623

[45] Jun. 7, 1983

[54] NONLINEAR CONTROL OF LIQUID LEVEL

[75] Inventors: Gary L. Funk; William S. Stewart, both of Bartlesville, Okla.

[73] Assignee: Phillips Petroleum Company, Bartlesville, Okla.

[21] Appl. No.: 221,679

[22] Filed: Dec. 30, 1980

[51] Int. Cl.³ .................................................. F17D 3/01
[52] U.S. Cl. ...................................... 137/2; 137/389; 137/395; 196/132; 202/160; 203/1; 203/DIG. 18; 364/183; 364/500
[58] Field of Search ................ 55/18, 48, 227; 137/2, 137/14, 386, 389, 395; 196/132; 202/160, 181; 203/1, DIG. 18; 364/183, 500

[56] References Cited

U.S. PATENT DOCUMENTS

| | | | |
|---|---|---|---|
| 3,224,947 | 12/1965 | Lupfer | 196/132 |
| 3,374,152 | 3/1968 | Rijnsdorp | 203/1 |
| 3,411,308 | 11/1968 | Bellinger | 203/1 |
| 3,449,215 | 6/1969 | Johnson et al. | 202/160 |
| 3,676,304 | 7/1972 | Hobbs et al. | 203/DIG. 18 |
| 3,974,364 | 8/1976 | Sallberg et al. | 235/151.31 |
| 4,106,916 | 8/1978 | Tuckett et al. | 196/132 |
| 4,111,218 | 9/1978 | Hobbs | 137/2 |
| 4,230,534 | 10/1980 | Stewart | 203/DIG. 18 |
| 4,265,263 | 5/1981 | Hobbs | 137/395 |

Primary Examiner—George L. Walton

[57] ABSTRACT

In a process in which liquid flows to a vessel and is then withdrawn from the vessel, method and apparatus is provided for implementing nonlinear liquid level control by providing a variable set point to a conventional level controller. The variable set point is a nonlinear function of the actual liquid level in the vessel. The variable set point enables the vessel to absorb disturbances in the flow rate of the liquid flowing to the vessel while the actual liquid level in the vessel remains between a desired high and low limit thus providing a smooth flow of liquid from the vessel.

8 Claims, 5 Drawing Figures

NONLINEAR CONTROL OF LIQUID LEVEL

This invention relates to nonlinear level control. In one aspect this invention relates to method and apparatus for implementing nonlinear level control using a conventional level controller.

As used herein, the term "nonlinear level control" refers to the control of a liquid level based on a function which is nonlinear with respect to the level being controlled. Nonlinear level control is typically utilized to reduce the variation in the flow from a vessel in which a liquid level is controlled. Typical applications for nonlinear level control are situations where a liquid level is being controlled by manipulating a flow which can cause undesired disturbances for another process. These situations typically occur in chemical processes in which the flow from one vessel, such as an accumulator or fractionator, is utilized as a feed for a second process.

As used herein, the term "conventional level controller" refers to any hardware device capable of accepting two input signals and producing a scaled output signal which is a linear function of the difference between the two input signals. Generally, a conventional level controller will be a completely analog device but some conventional level controllers now combine analog circuitry with microprocessors. The term conventional level controller does not include a controller implemented entirely by use of a software program for a digital computer.

A conventional level controller generally compares the actual liquid level in a vessel (referred to as process variable) to the desired liquid level in a vessel (referred to as set point). The output of the conventional level controller is a linear function of the difference between the process variable and the set point. As an example, the output control signal of a proportional-integral-derivative controller may be represented as $$S = K_1 E + K_2 \int E \, dt + K_3 \frac{dE}{dt}$$

where
 S = output control signals;
 E = difference between two input signals; and
 $K_1$, $K_2$ and $K_3$ = constants.

The drawings will be utilized to provide background information concerning the present invention as well as provide a detailed description of the present invention. A brief description of the drawings is as follows.

Figure 1:
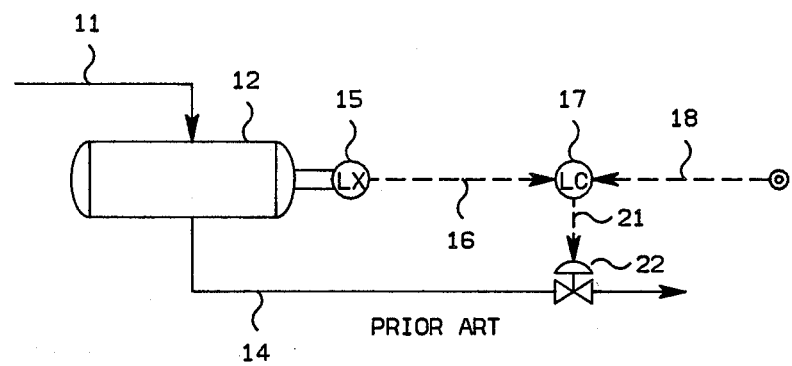
FIG. 1 is a diagrammatic illustration of a typical linear level control system of the prior art.

Referring now to FIG. 1, a fluid stream is provided through conduit means 11 to the accumulator 12. Fluid in the accumulator 12 is withdrawn through conduit means 14 and may be provided to any desired destination. The level transducer 15 provides an output signal 16 which is representative of the liquid level in the accumulator 12. Signal 16 is provided from the level transducer 15 to the level controller 17 as the process variable input. The conventional level controller 17 is also provided with a set point signal 18 which is representative of the desired liquid level in the accumulator 12. The set point signal 18 is generally provided by an operator and remains constant for any particular accumulator.

In response to signals 16 and 18, the conventional level controller 17 provides an output signal 21 which is responsive to the difference between signals 16 and 18 (the difference is generally referred to as the "error"). Signal 21 is provided from the level controller 17 as a control signal to the control valve 22 which is operably located in conduit means 14. The control valve 22 is manipulated in response to signal 21 to thereby maintain the actual liquid level in the accumulator 12 substantially equal to the desired liquid level represented by signal 18.

Figure 2:
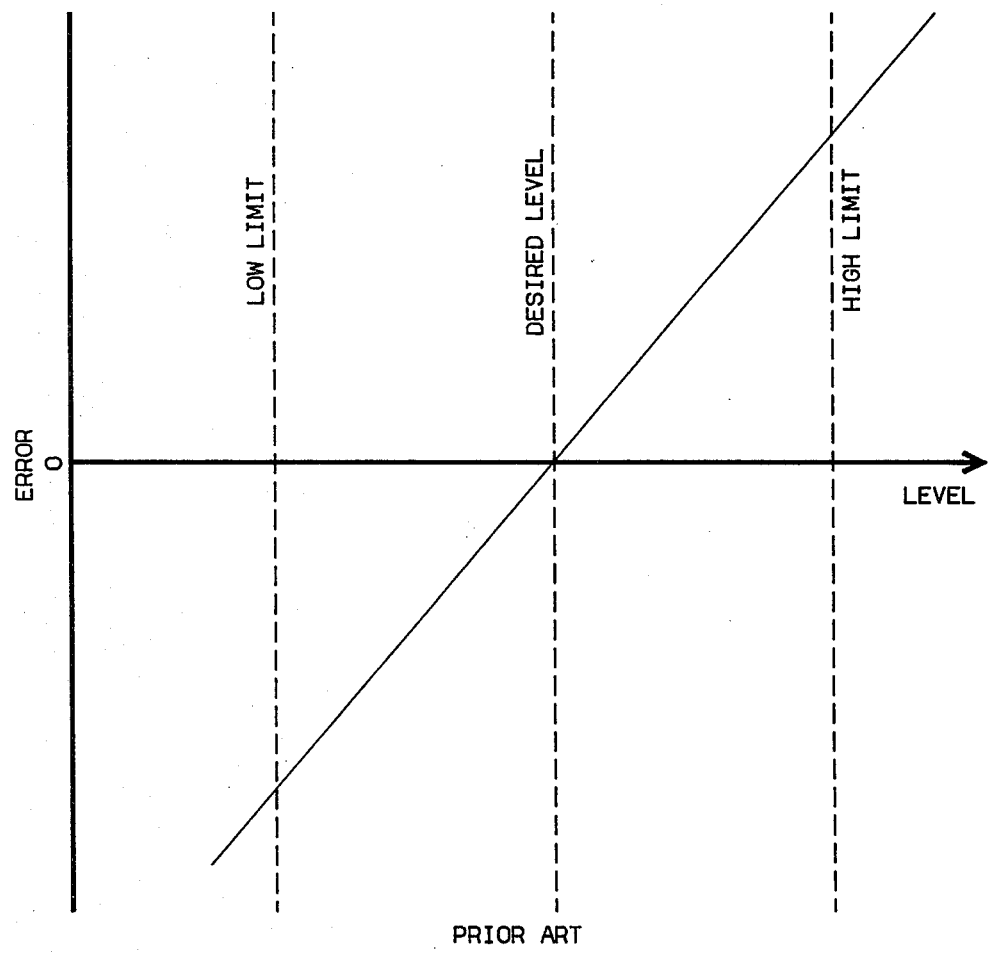
FIG. 2 is a graphical representation of linear level control according to the prior art.

A plot of the error as a function of liquid level is illustrated in FIG. 2. As has been previously stated, the plot is illustrative of linear liquid level control. For the error function illustrated in FIG. 2, any disturbance in the flow of the fluid stream entering the accumulator 12 is transmitted to the flow of the fluid stream flowing through conduit means 14 because the conventional level controller will immediately try to compensate in order to keep the liquid level in the accumulator 12 at some desired level. The amount of the compensation applied will be directly related to the change in the flow rate of the fluid stream flowing through conduit means 11. This is undesirable because the accumulator is not being utilized to absorb disturbances in the flow rate of the fluid flowing through conduit means 11.

In general, it is preferable to have the accumulator absorb such disturbances rather than pass those disturbances on to a process. This may be accomplished by providing very little control action when the liquid level is greater than the low limit and less than the high limit. Thus, when the liquid level in the accumulator 12 is within the limits, the flow rate of the fluid flowing through conduit means 14 should remain reasonably constant with the liquid level in the accumulator 12 being allowed to vary within the limits.

If the liquid level in the accumulator 12 goes below the low limit or exceeds the high limit, rapid control action should be taken to prevent the accumulator from going dry or becoming flooded. This will obviously cause substantial disturbances in the flow rate of the fluid flowing through conduit means 14 but is required to prevent a dangerous condition from occurring.

Taking very little control action when the liquid level in the accumulator 12 is between the limits and taking rapid control action if the liquid level in the accumulator 12 goes outside the limits will be referred to hereinafter as the "desired control action." The desired control action can be implemented only by using nonlinear level control.

Many times the operators of a plant which utilizes the conventional level control illustrated in FIG. 1 would like to switch to nonlinear level control but do not want to go to the expense of replacing the conventional level controller 17 with a nonlinear level controller or direct digital nonlinear level control by a computer. Often, the expense of such changes would not justify the benefits to be obtained. It is thus an object of this invention to provide method and apparatus for implementing nonlinear level control using a conventional level controller.

Figure 3:
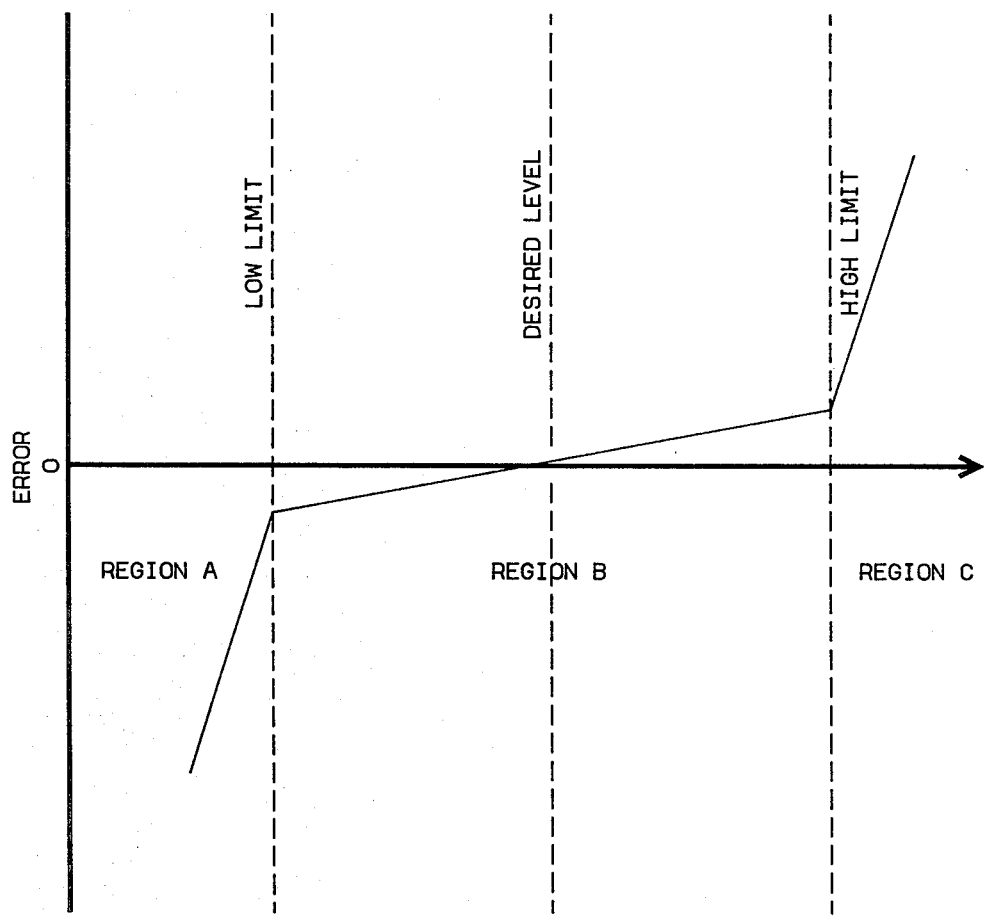
FIG. 3 is a graphical illustration of nonlinear level control.

A preferred nonlinear level control function which would provide the desired control action is illustrated in FIG. 3. It is noted that any function which accomplishes the desired control action could be utilized but the present invention will be described in terms of the function illustrated in FIG. 3. The error function illustrated in FIG. 3 provides very little control action when the liquid level is in region B between a low limit for the liquid level and a high limit for the liquid level. The slope of the error function in region B would be determined by the criticality of the liquid level in the vessel not exceeding a low limit or high limit. Generally, the liquid level in an accumulator is not critical within the limits and the slope of the error function illustrated in FIG. 3 would be very small such that very little control action is taken when the liquid level in the vessel is in region B.

In region A or region C, much more drastic control action is taken to bring the liquid level in the vessel back into region B. Again, the slope of the error function in region A or region C would be determined by the criticality of non exceeding the low limit or high limit. In general, it is very undesirable for an accumulator to run dry or to be flooded and thus it is necessary to very quickly open or close the control valve 22 illustrated in FIG. 1 if the liquid level in the vessel goes below the low limit or exceeds the high limit.

In accordance with the present invention, the desired control action is achieved by automatically manipulating the set point provided to a conventional level controller in response to the actual liquid level in a vessel. This may be accomplished by a number of techniques but in general the process variable 16 is utilized to generate a modifying function which is in general the reciprocal of an error function which will provide the desired control action such as the error function illustrated in FIG. 3. The process variable signal may then be modified by the modifying function to provide a variable set point signal to the conventional level controller 17 which provides the desired control action.

Figure 4:
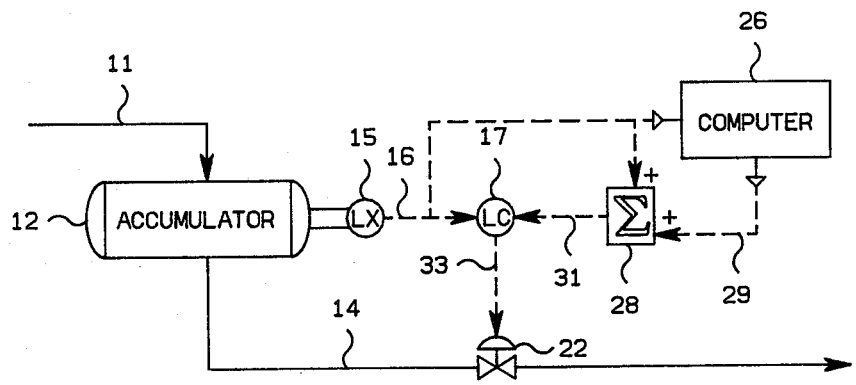
FIG. 4 is a diagrammatic illustration of nonlinear level control using a conventional level controller according to the present invention.
Figure 5:
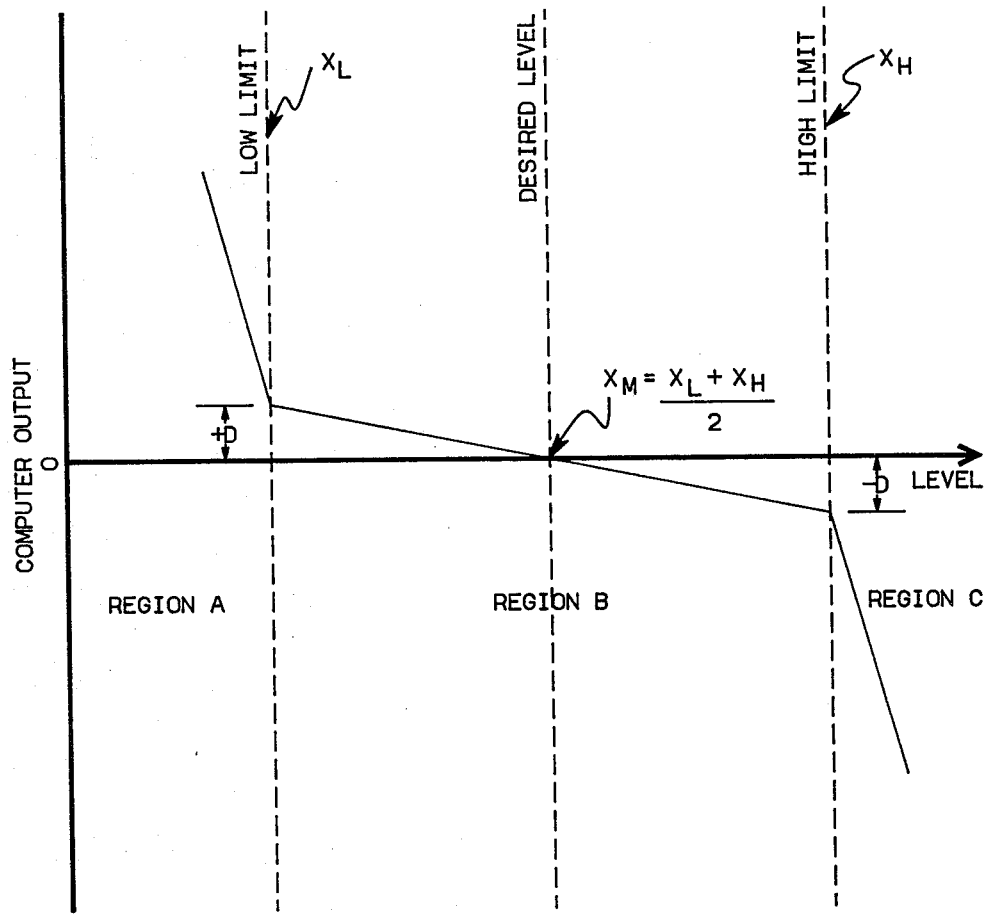
FIG. 5 is a graphical illustration of the output signal from the computer illustrated in FIG. 4.

Other objects and advantages of the invention will be apparent from the foregoing brief description of the invention and from the claims, as well as from the detailed description of FIGS. 4 and 5 which follows:

Referring now to FIG. 4, conduit means 11 and 14, accumulator 12, level transducer 15, signal 16 and the control valve 22 are as illustrated in FIG. 1. Signal 16, which is representative of the actual liquid level in the accumulator 12, is also provided as an input to computer means 26 and the summing block 28. In response to signal 16, computer means 26 generates a modifying signal 29 which is responsive to the actual liquid level in the accumulator 12. The modifying signal 29 will be described more fully hereinafter, but in general signal 29 is plotted as a function of the liquid level in FIG. 5. Signal 29 is provided from the computer 26 as an input to the summing block 28. Signal 29 is summed with signal 16 to establish signal 31 which is provided as the set point signal to the conventional level controller 17.

In response to signals 16 and 31, the conventional level controller 17 establishes an output signal 33 which is responsive to the difference between signals 16 and 31. Signal 33 is provided from the level controller 17 to the control valve 22 and is utilized in the same manner as previously described for signal 21 in FIG. 1.

In region B, illustrated in FIG. 5, there would be very little difference between signals 16 and 31 and thus very little control action would be taken. The difference between signals 16 and 31 would be determined by the magnitude of A illustrated in FIG. 5 which determines the slope of the computer output function (signal 29) in region B. As has been previously stated, the magnitude of A would be determined by the criticality of not allowing the liquid level in the accumulator 12 to go below the low limit or exceed the high limit.

In region A, signal 31 may become much greater than signal 16 which will have the effect of rapidly closing the control valve 22 if the low limit is exceeded by any appreciable margin. This is the desired control action. In contrast, in region C signal 31 may be much less than signal 16 if the high limit is exceeded by any appreciable margin and this will have the effect of causing the conventional level controller 17 to rapidly open the control valve 22 which is the desired control action. Thus, the desired control action may be implemented using a conventional level controller by providing a modified set point as is illustrated in FIG. 4.

A set of equations which may be utilized to generate the computer output function illustrated in FIG. 5 are as follows:

$$CO_A = S_A(PV - X_L) + D \tag{1}$$

$$CO_B = \left(\frac{D}{X_H - X_M}\right)(-PV + X_M) \tag{2}$$

$$CO_C = S_C(PV - X_H) - D \tag{3}$$

where $CO_A$ = magnitude of signal 29 when the actual liquid level is in region A illustrated in FIG. 5;

$CO_B$ = magnitude of signal 29 when the actual liquid level is in region B illustrated in FIG. 5;

$CO_C$ = magnitude of signal 29 when the actual liquid level is in region C illustrated in FIG. 5;

PV = the actual liquid level in the accumulator 12 as represented by signal 16;

$X_L$ = the low limit on the liquid level in the accumulator 12;

$X_H$ = the high limit on the liquid level in the accumulator 12;

$X_M = (X_L + X_H)/2$; and $S_A$, $S_C$ and D are adjustable constants.

The magnitude of the adjustable constant D is determined by the criticality of maintaining the liquid level in the accumulator 12 in region B. In like manner, the magnitude of $S_A$ and $S_C$, which represent the slope in region A and C respectively, is determined by the criticality of not allowing the accumulator 12 to go dry or to become flooded, respectively.

A simplified listing of computer statements which could be utilized to generate signal 29 are as follows. Symbols utilized in the computer statements are as defined for Equations (1), (2) and (3). No subscripting is utilized and thus $X_L$ of Equation (1) is represented as XL in the simplified listing. Also, $CO_A$, $CO_B$ and $CO_C$ are represented as CO with the computer logic being utilized to determine which one of Equations (1), (2) and (3) is utilized to generate the computer output signal 29.

PV=

XH=

XL=

D=

SA=

SC=

XM=(XL+XH)/2

CO=(D/(XH−XM)*(−PV+XM)
IF (PV·LT·XL) CO=SA*(PV−XL)+D

IF (PV·GT·XH) CO=SC*(PV−XH)−D

In the simplified listing set forth above, the process variable signal PV would be provided as an input to the computer 26 by means of signal 16. The values of XH and XL would be input to the computer based on the desired high limit and low limit for the particular vessel in which the liquid level is being controlled. The magnitude of D, SA and SC would be input into the computer as constants. The manner in which the magnitude of D, SA and SC would be determined has been previously described. The computer would then calculate XM and would calculate a value for the computer output CO in region B. The thus calculated computer output will be changed by the IF statements only if the actual liquid level goes below the low limit or exceeds the high limit.

Any desired values for $X_H$, $X_L$, D, $S_A$ and $S_C$ may be utilized within the process constraints. In general, $X_H$ will be a level in the range of about 85% full to about 95% full with 90% full being preferred. In like manner, $X_L$ will be a level in the range of 15% empty to 5% empty with 10% empty being preferred. D will have a value in the range of about 0% to about 30% of the output of the conventional controller at $X_L$ and $X_H$ with 10% of the output being preferred. $S_A$ can be calculated as follows:

$$S_A = \frac{C_E - D}{X_L}$$

where
  $C_E$ is in the range of 1.5 to 2 times the output of the computer 26 when the accumulator is empty. S can be calculated as follows:

$$S_C = \frac{C_F - D}{\text{Full} - X_H}$$

where
  $C_F$ is in the range of 1.5 to 2 times the output of the computer 26 when the accumulator is full; and
  FULL=the level of the accumulator when full.

The invention has been described in terms of the control of liquid level in an accumulator. However, the invention is applicable to the control of the liquid level in any container or vessel or any means for storing a liquid.

Generation of the modifying signal 29 has been described in terms of use of a digital computer. However, signal 29 could be generated utilizing analog logic or other computation means if desired.

Specific components which can be used in the practice of the invention as illustrated in FIG. 4 such as level transducer 15, conventional level controller 17, pneumatic control valve 22 and summing block 28 are each well known, commercially available control components such as are illustrated and described at length in Perry's *Chemical Engineer's Handbook*, 4th Edition, Chapter 22, McGraw-Hill. A suitable digital computer is the OPTROL 7000 Process Computer System from Applied Automation, Inc., Bartlesville, Oklahoma.

The invention has also been described in terms of a specific implementation which provides the desired control action. The invention is applicable to any signal manipulation which provides the desired control action utilizing a conventional level controller. Also, reasonable variations and modifications other than those specifically set forth are possible by those skilled in the art and are within the scope of the described invention and the appended claims.

That which is claimed is:
1. Apparatus comprising:
  container means;
  means for supplying a liquid to said container means;
  means for withdrawing said liquid from said container means;
  a conventional level controller means;
  means for establishing a first signal representative of the actual liquid level in said container means and for supplying said first signal as a process variable input to said conventional level controller means;
  means for establishing a variable set point signal and for supplying said variable set point signal as a set point input to said conventional level controller means, wherein the magnitude of said variable set point signal automatically varies as a nonlinear function of the actual liquid level in said container means and wherein said conventional level controller means establishes a control signal which is responsive to the difference between said first signal and said variable set point signal; and
  means for manipulating the flow rate of the liquid withdrawn from said container means in response to said control signal.

2. Apparatus in accordance with claim 1 wherein the flow rate of the liquid withdrawn from said container means is manipulated in response to said control signal in such a manner that the flow rate of the liquid withdrawn from said container means is charged more rapidly in response to an incremental change in the magnitude of said first signal if the actual liquid level in said container means is greater than a high limit for the actual liquid level in said container means or less than a low limit for the actual liquid level in said container means than in response to said incremental change in the magnitude of said first signal if the actual liquid level in said container means is less than or equal to said high limit or greater than or equal to said low limit.

3. Apparatus in accordance with claim 1 wherein said means for establishing said variable set point signal comprises:
  means for establishing a modifying signal in response to said first signal, wherein said modifying signal is a nonlinear function of the actual liquid level in said container means; and
  means for summing said first signal and said modifying signal to establish said variable set point signal.

4. Apparatus in accordance with claim 3 wherein said modifying signal is equal to $S_A(PV−X_L)+D$ if the actual liquid level in said container means is less than a low limit for the actual liquid level in said container means, is equal to $$\left(\frac{D}{X_H - X_M}\right)(-PV + X_H + X_M)$$

if the actual liquid level is equal to or greater than said low limit but less than or equal to a high limit for the actual liquid level in said container means; and is equal to $$S_C(PV - X_H) - D$$

if the actual liquid level in said container means is greater than said high limit, wherein $PV$ = said first signal;

$X_L$ = said low limit;

$X_H$ = said high limit;

$X_M = (X_L + X_H)/2$; and $S_A$, $S_C$ and $D$ are adjustable constants.

5. A method for implementing nonlinear level control, for a liquid in a means for containing said liquid, using a conventional level controller, said method comprising the steps of:
    establishing a first signal representative of the actual liquid level in said means for containing said liquid;
    supplying said first signal as a process variable input to said conventional level controller;
    establishing a variable set point signal which automatically changes in magnitude when said actual liquid level changes, wherein said automatic changes are a nonlinear function of the changes in said liquid level;
    supplying said variable set point signal as a set point input to said conventional level controller, wherein said conventional level controller establishes a control signal which is responsive to the difference between said first signal and said variable set point signal; and
    manipulating the flow rate of the liquid withdrawn from said means for containing said liquid in response to said control signal.

6. A method in accordance with claim 5 wherein the flow rate of the liquid withdrawn from said means for containing said liquid is manipulated in response to said control signal in such a manner that the flow rate of the liquid withdrawn from said means for containing said liquid is changed more rapidly in response to an incremental change in the magnitude of said first signal if the actual liquid level in said means for containing said liquid is greater than a high limit for the actual liquid level in said means for containing said liquid or less than a low limit for the actual liquid level in said means for containing said liquid than in response to said incremental change in the magnitude of said first signal if the actual liquid level in said means for containing said liquid is less than or equal to said high limit or greater than or equal to said low limit.

7. A method in accordance with claim 5 wherein said step of establishing said variable set point signal comprises:
    establishing a modifying signal in response to said first signal, wherein the magnitude of said modifying signal is a nonlinear function of the actual liquid level in said container means; and
    summing said first signal and said modifying signal to establish said variable set point signal.

8. A method in accordance with claim 7 wherein said modifying signal is equal to $$S_A(PV - X_L) + D$$

if the actual liquid level in said container means is less than a low limit for the actual liquid level in said means, for containing said liquid is equal to $$\left(\frac{D}{X_H - X_M}\right)(-PV + X_H + X_M)$$

if the actual liquid level is equal to or greater than said low limit but less than or equal to a high limit for the actual liquid level in said means; for containing said liquid; and is equal to $$S_C(PV - X_H) - D$$

if the actual liquid level in said container means is greater than said high limit, wherein $PV$ = said first signal;
$X_L$ = said low limit;
$X_H$ = said high limit;
$X_M = (X_L + X_H)/2$; and $S_A$, $S_C$ and $D$ are adjustable constants.

* * * * *